United States Patent
Kim et al.

(10) Patent No.: US 10,673,766 B2
(45) Date of Patent: Jun. 2, 2020

(54) VARIABLE-SIZE SAMPLING METHOD FOR SUPPORTING UNIFORMITY CONFIDENCE UNDER DATA-STREAMING ENVIRONMENT

(71) Applicant: KANGWON NATIONAL UNIVERSITY University-Industry Cooperation Foundation, Gangwon-do (KR)

(72) Inventors: Ha Jin Kim, Gangwon-do (KR); Myeong Seon Gil, Gangwon-do (KR); Yang Sae Moon, Gangwon-do (KR)

(73) Assignee: KANGWON NATIONAL UNIVERSITY University-Industry Cooperation Foundation, Gangwon-Do (KR)

( * ) Notice: Subject to any disclaimer, the term of this patent is extended or adjusted under 35 U.S.C. 154(b) by 128 days.

(21) Appl. No.: 15/955,400

(22) Filed: Apr. 17, 2018

(65) Prior Publication Data

US 2019/0124014 A1 Apr. 25, 2019

(30) Foreign Application Priority Data

Oct. 24, 2017 (KR) .................. 10-2017-0138480

(51) Int. Cl.
*H04L 12/28* (2006.01)
*H04L 12/807* (2013.01)
(Continued)

(52) U.S. Cl.
CPC ............ *H04L 47/27* (2013.01); *G06F 7/58* (2013.01); *G06F 16/24568* (2019.01);
(Continued)

(58) Field of Classification Search
CPC ...... G06F 16/24568; G06F 17/18; G06F 7/58; H04L 43/00; H04L 47/27; H04L 49/901
See application file for complete search history.

(56) References Cited

U.S. PATENT DOCUMENTS 6,542,886 B1 * 4/2003 Chaudhuri .......... G06F 16/2462
8,392,381 B2 * 3/2013 Al-Kateb ............ G01D 21/00
707/688

FOREIGN PATENT DOCUMENTS

KR 10-0815866 B1 3/2008

* cited by examiner

*Primary Examiner* — Phuc H Tran
(74) *Attorney, Agent, or Firm* — Harness, Dickey & Pierce, P.L.C.

(57) ABSTRACT

Disclosed is a variable-size sampling method under a data-streaming environment, including: calculating a maximum window size that satisfies a lower limitation of a predetermined uniformity confidence level at all times; inputting a data stream to be sampled; comparing a data stream length input until a current time point with the maximum window size; inspecting a sample size and a sampling fraction if the maximum window size is larger than the data stream length; performing sampling by generating a slot to increase the sample size if the current sample size is smaller than a predetermined percentage (P %) of the data stream; and directly performing sampling without generating a slot if the current sample size is equal to or larger than the predetermined percentage (P %) of the data stream. As a result, degradation of uniformity confidence during variable-size sampling under a real-time streaming environment can be prevented to improve sampling performance.

5 Claims, 8 Drawing Sheets

(51) Int. Cl.
*H04L 12/879* (2013.01)
*G06F 7/58* (2006.01)
*G06F 17/18* (2006.01)
*G06F 16/2455* (2019.01)
*H04L 12/26* (2006.01)

(52) U.S. Cl.
CPC .............. *G06F 17/18* (2013.01); *H04L 43/00* (2013.01); *H04L 49/901* (2013.01)

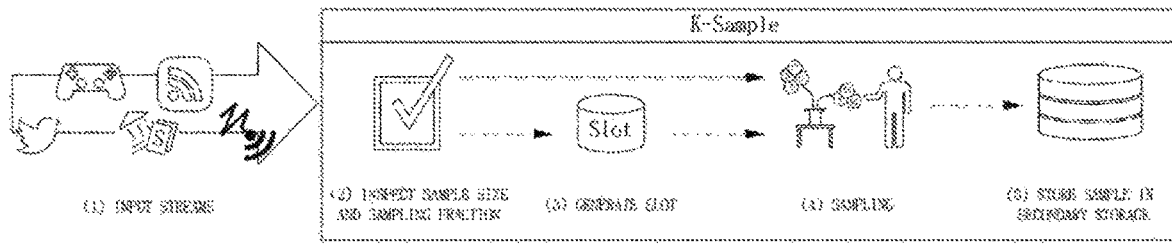

FIG. 1
(PRIOR ART)

Input: $p$, sampling ratio ($p \in [0, 1]$)
        stream, data stream of undefined length
Output: reservoir[], list
1.   sLength ← 0
2.   slotRound ← 0
3.   while stream != EOF do
4.     sLength++
5.     if reservoir.size() < ($p$ × sLength) then
6.       reservoir.newSlot()
7.       slotRound ← 0
8.     slotRound++
9.     probability ← $\frac{1}{slotRound}$
10.    rnd ← Random(0, 1)
11.    if rnd ≤ probability then
12.       reservoir.currentSlot ← stream[sLength]
13.   return reservoir

FIG. 2
(PRIOR ART)

OPERATION PROCESS OF K-SAMPLE METHOD

SAMPLING SCHEMA

K-Sample

UC K-Sample

Input: *p*, sampling ratio ($p \in [0, 1]$)
Input: *stream*, data stream of undefined length
Input: ε, threshold of UC
Output: *reservoir*, priority queue
1.    *sLength* ← 0
2.    *wLength* ← 0
3.    *w* ← *maximum window size that causes UC to exceed ε*
4.    while *stream* != EOF do
5.       *sLength*++
6.       *wLength*++
7.       if *sLength*=1 or *wLength* > *w* then
8.          *reservoir.flush()*
9.          *wLength* ← 1
10.      *rand* = Random(0, 1)
11.      if *reservoir.size()* < (*p* × *windowRound*) then
12.         *reservoir.newSlot()*
13.         *reservoir.insert(stream[sLength],rand)*
14.      else
15.         *minimum* = *reservoir.delete()*
16.         if *rand* > *minimum.rand* then
17.            *reservoir.insert(stream[sLength], rand)*
18.         else
19.            *reservoir.insert(minimum)*
20. return *reservoir*
21.

FIG. 11

VARIABLE-SIZE SAMPLING METHOD FOR SUPPORTING UNIFORMITY CONFIDENCE UNDER DATA-STREAMING ENVIRONMENT

CROSS REFERENCES TO RELATED APPLICATIONS

The present application claims priority to Korean Patent Application No. 2017-0138480, filed in the Korean Patent Office on Oct. 24, 2017, the entire contents of which are incorporated herein by reference.

Field

The present invention relates to a sampling method under a data-streaming environment, and more particularly, to a variable-size sampling method for supporting uniformity confidence under a data-streaming environment.

BACKGROUND

Description of Related Art

A "streaming environment" refers to an environment in which a large number of data streams are generated in real time. In general, processing such a large number of data streams is very difficult and necessitates a lot of processing cost. Therefore, in order to efficiently process the data streams, sampling is usually employed by appropriately reflecting data characteristics and patterns.

The sampling under the streaming environment is roughly classified into a fixed-size scheme and a fixed-fraction scheme. In the fixed-size scheme, sampling is performed by fixing the sample size (the number of samples). In the fixed-rate scheme, the sampling is performed by fixing the sampling fraction instead of the sample size.

A K-sample method is a representative fixed-fraction sampling method in which a single sample element is selected on a slot basis. The K-sample method is a random sampling method for constantly maintaining the sampling fraction for input streams by dynamically increasing the sample size under a streaming environment.

In the K-sample method, a sampling fraction $p(\in [0, 1])$ is input from a user, and sampling is performed such that the sample size is maintained so as to be equal to or higher than P % ($=p \times 100$) of the data stream at all times. That is, the sample size dynamically increases in order to maintain P % of the successively incoming data streams as the sample. For example, supposing that the sampling fraction is set to "p=0.1", at least 10% of the input data streams are maintained as the sample by dynamically increasing the sampling size as the streams are input.

FIG. 1 is a diagram illustrating an operation process of the K-sample method.

Referring to FIG. 1, in the operation of the K-sample method, first, a data stream to be sampled is input (1).

Then, as the data stream is input, it is determined whether or not the current sample size is set to be equal to or larger than "P %" of the data stream.

If the current sample size is smaller than P % of the data stream, a slot is generated (3), a sampling is performed (4), and the previous slot is stored in a secondary storage (5).

If the current sample size is equal to or larger than P % of the data stream, only the sampling is performed (4).

Here, the slot generation process (3) is a course of generating a single slot which is a single element memory space added to the sample.

Note that the sampling process (4) is a course of performing sampling for the current slot. In this sampling, a probability that a data stream element is selected as the slot is compared with an arbitrarily created random number. If the probability that the data stream element is selected as the slot is equal to or higher than the random number, the corresponding element is inserted into the slot.

The secondary storage storing process (5) is a course of storing a sample element stored in a previous slot prior to the current slot in the secondary storage. This process is to overcome a memory constraint.

FIG. 2 illustrates an algorithm of the K-sample method.

Referring to FIG. 2, in the K-sample method, a sampling fraction p and a data stream are received as an input, and sampling starts using an empty sample list reservoir.

If the current sample size is smaller than P % of the data stream, that is, if the current sample size is smaller than "p×sLength", a new slot is generated to increase the sample size (lines 5 to 8).

Then, a probability that the data stream element newly added to the current slot is selected is calculated, and a random number is generated between "0" and "1" (lines 9 to 10).

If the generated random number is equal to or smaller than the probability that the corresponding element is selected for a slot, the data stream element is inserted into the current slot (lines 11 to 12)

This process is repeated whenever every data stream element is input. If there is a memory constraint, the previous slot is stored in the secondary storage when a new slot is allocated (line 6).

Uniformity confidence (UC) is a performance index representing how many possible numbers are considered in a particular sampling algorithm to generate a sample. That is, in a sampling algorithm having high uniformity confidence, the sampling is performed by considering data serving as a sampling target in the sampling course as many as possible. The uniformity confidence is calculated as a ratio between "the number of different samples of the same size possible statistically" and "the number of different samples of the same size possible with the algorithm" as expressed in the following Formula 1.

$$UC = \frac{\text{the number of different samples of the same size possible with the algorithm}}{\text{the number of different samples of the same size possible statistically}} \times 100 \quad \text{[Formula 1]}$$

For example, supposing that a sample of a size of "3" is randomly extracted from ten data, the sampling uniformity confidence by considering all of the ten data is set to "100% ($=((10|3))/((10|3))\times 100$)". Meanwhile, if the three data of the front part are not considered among the ten data, that is, if only seven data are included in the sample extraction range, the uniformity confidence of this sampling becomes "29.17% ($=((7|3))/((10|3))\times 100$)". If it is difficult to include all of the data in the sample extraction range as in the streaming environment, how many data are considered in the sampling algorithm for improving the uniformity confidence is an important performance factor.

Under the streaming environment in which data are generated in real time, it is difficult to perform the sampling by including all of the data in the extraction range due to a memory constraint problem, and the sampling is performed by setting only the data stored in a memory at the current time point as the sample extraction range. If it is difficult to perform the sampling by setting all of the data as the extraction range in this manner, it is necessary to provide a factor for maintaining sampling performance. In this case, the uniformity confidence can be used as a criterion for determining the sampling performance. Therefore, it is very important to improve the uniformity confidence.

In the K-sample method, the sampling fraction for the data stream is maintained by dynamically increasing the sample size. Therefore, the K-sample method is very useful in the streaming environment. However, since the K-sample method does not consider all of the data streams during the sampling, a memory loss problem occurs. Due to such a memory loss problem, the uniformity confidence is very poor and is continuously reduced.

FIG. 3 is a graph for comparing the uniformity confidence between the reservoir sampling and the K-sample sampling.

FIG. 3 specifically illustrates a uniformity confidence reduction problem in the K-sample method.

Referring to FIG. 3, the uniformity confidence is compared between the reservoir sampling and the K-sample method (p=0.01). From FIG. 3, it is recognized that the uniformity confidence of the reservoir sampling is maintained at 100% at all times. This is because the sample size of the reservoir sampling does not change, and the sampling is performed by setting all of the input streams as the extraction range.

Meanwhile, in the case of the K-sample method, it is recognized that the uniformity confidence is remarkably reduced due to the memory loss problem. In addition, the uniformity confidence of the K-sample method continuously decreases from the start of sampling. Specifically, referring to FIG. 3, it is recognized that the uniformity confidence abruptly decreases in the section ⓐ and then steadily decreases in the section ⓑ. Here, a phenomenon that the uniformity confidence abruptly decreases at the initial stage of the K-sample method is called an initial uniformity confidence reduction problem, and a phenomenon that the uniformity confidence steadily decreases is called a steady uniformity confidence reduction problem.

CITATION LIST

Patent Literature

Patent Literature 1: Korean Patent No. 10-0815866

SUMMARY OF THE INVENTION

In view of the aforementioned problems, it is therefore an object of the invention to provide a variable-size sampling method for supporting high uniformity confidence under a data stream environment.

According to an aspect of the present invention, there is provided a variable-size sampling method under a data-streaming environment, including: calculating a maximum window size that satisfies a lower limitation (ε) of a predetermined uniformity confidence level at all times; inputting a data stream to be sampled if the maximum window size is calculated; comparing a data stream length of the data stream input until a current time point with the maximum window size; inspecting a sample size and a sampling fraction if the maximum window size is larger than the data stream length; performing sampling by generating a slot to increase the sample size if the current sample size is smaller than a predetermined percentage (P %) of the data stream as a result of the inspection of the sample size and the sampling fraction; and directly performing sampling without generating a slot if the current sample size is equal to or larger than the predetermined percentage (P %) of the data stream as a result of the inspection of the sample size and the sampling fraction.

The variable-size sampling method described above may further include: storing the sample generated from the current window in a storage if the maximum window size is smaller than the data stream length; and inspecting the sample size and the sampling fraction by generating a new window.

In the variable-size sampling method described above, if a probability that a data stream element is selected for a slot is higher than a random value generated arbitrarily in performing the sampling, the data stream may be inserted into the slot and be replaced with an element stored in the existing slot.

In the variable-size sampling method described above, the percentage P % may be expressed as "p×100" where "p(∈[0, 1])" denotes a sampling fraction.

In the variable-size sampling method described above, the maximum window size satisfying the lower limitation (ε) of the uniformity confidence and the sampling fraction (p) may be calculated on the basis of the following formula:

$$\varepsilon \leq \frac{\sum_{x=max[0,(\lceil kp \rceil+1)-m)}^{\lceil kp \rceil} \binom{k}{x}\binom{m}{\lceil kp \rceil+1-x}}{\binom{k+m}{\lceil kp \rceil+1}} \times 100,$$

where "ε" denotes the lower limitation of the uniformity confidence, "p" denotes the sampling fraction, "k" denotes a size of the stream incoming until the current time point, and "m" denotes the maximum input stream size that can input by incrementing the sample size by one.

According to the present invention, it is possible to prevent degradation of uniformity confidence during variable-size sampling under a streaming environment in which data are created in real time and to improve sampling performance.

BRIEF DESCRIPTION OF THE DRAWINGS

The foregoing and additional features and characteristics of this disclosure will become more apparent from the following detailed description considered with reference to the accompanying drawings, wherein:

FIG. 1 is a schematic diagram illustrating an operation process of a K-sample method;

FIG. 2 illustrates an algorithm of a K-sample method;

FIG. 11 illustrates a UC K-sample algorithm according to an embodiment of the invention.

DETAILED DESCRIPTION

Figure 3:
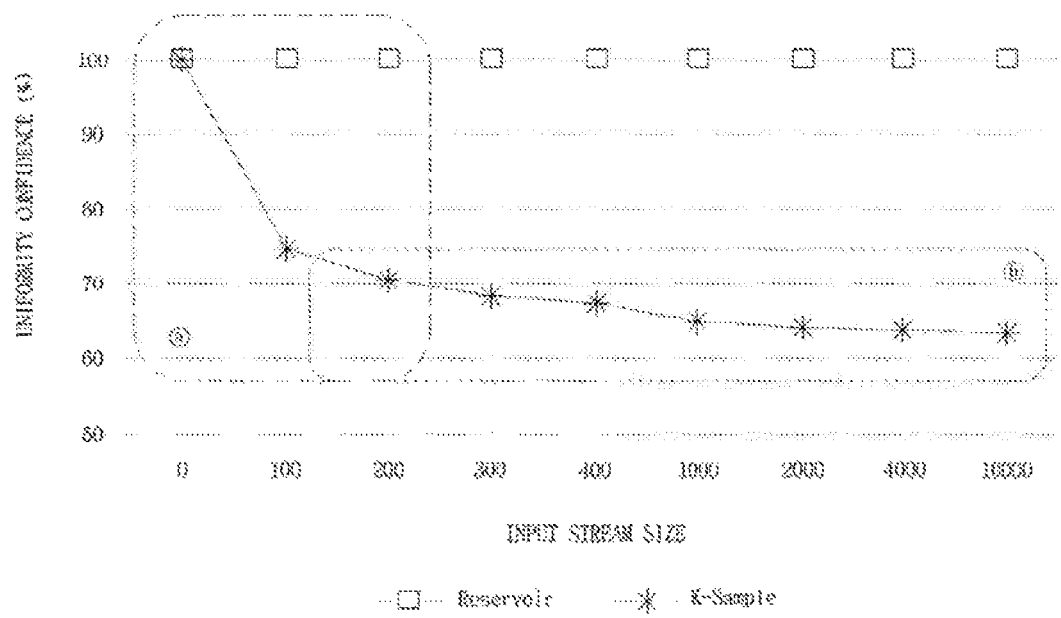
FIG. 3 is a graph for comparing uniformity confidence between the reservoir sampling method and the K-sample sampling method.

Hereinafter, preferred embodiments of the invention will be described in detail with reference to the accompanying drawings. It is noted that like reference numerals denote like elements throughout overall drawings. In addition, descriptions of well-known apparatus and methods may be omitted so as to not obscure the description of the representative embodiments, and such methods and apparatus are clearly within the scope and spirit of the present disclosure.

The terminology used herein is only for the purpose of describing particular embodiments and is not intended to limit the invention. As used herein, the singular forms "a," "an," and "the" may be intended to include the plural forms as well, unless the context clearly indicates otherwise. It is further to be noted that, as used herein, the terms "comprises," "comprising," "include," and "including" indicate the presence of stated features, integers, steps, operations, units, and/or components, but do not preclude the presence or addition of one or more other features, integers, steps, operations, units, and/or components, and/or combination thereof.

Unless specified otherwise, all terminologies used herein including technical or scientific terminologies have the same meanings as those generally appreciated by a person ordinarily skill in the art to which the present invention pertains. Terminologies defined in typical dictionaries should be construed to have meanings matching those described in the context of the related art, and should not be construed as being abnormal or excessively formal unless defined apparently herein.

The present invention will now be described with reference to the accompanying drawings, in which like reference numerals denote like elements throughout the entire specification, and they will not be repeatedly described intentionally. In the following description, any specific word or sentence for the related art will not be provided for simplicity purposes if it unnecessarily obscures the subject matter of the invention.

The present invention relates to a variable-size sampling method for supporting high uniformity confidence (UC) under a data-streaming environment.

According to the present invention, the variable-size sampling method under a data-streaming environment is performed by a terminal device such as a computer, or a control unit or processor that comprehensively controls the terminal device such as a computer. That is, the variable-size sampling method under a data-streaming environment according to the invention refers to an algorithm as a sort of software, and the software algorithm may be executed by a control unit or a processor of a terminal device such as a computer.

That is, the variable-size sampling method under a data-streaming environment according to the invention may be implemented by a control unit that comprehensively controls a computer or a central processing unit (CPU) that processes or control command signals and a series of programs. That is, the variable-size sampling method under a data-streaming environment according to the invention may be implemented as an algorithm or logics as a sort of software, and the software algorithm may be executed by a control unit or a central processing unit of a computer.

Herein, "p ($\in[0, 1]$)" denotes a sampling fraction, and "P %" denotes the sampling fraction expressed as a percentage of "p×100".

The K-sample method has two problems relating to the uniformity confidence reduction.

First, the initial uniformity confidence reduction problem in which the uniformity confidence remarkably decreases at the initial stage of the K-sample method is caused by the following two reasons.

First, the initial uniformity confidence reduction problem occurs because a range of the data stream selectable for a particular slot is restrictive. In the K-sample method, the sample size is dynamically incremented by one in order to maintain the sampling fraction for the data stream while the sample size is smaller than P % of the data stream. However, in this case, a range of the data stream that can be stored in each slot is restricted.

Figure 4A:
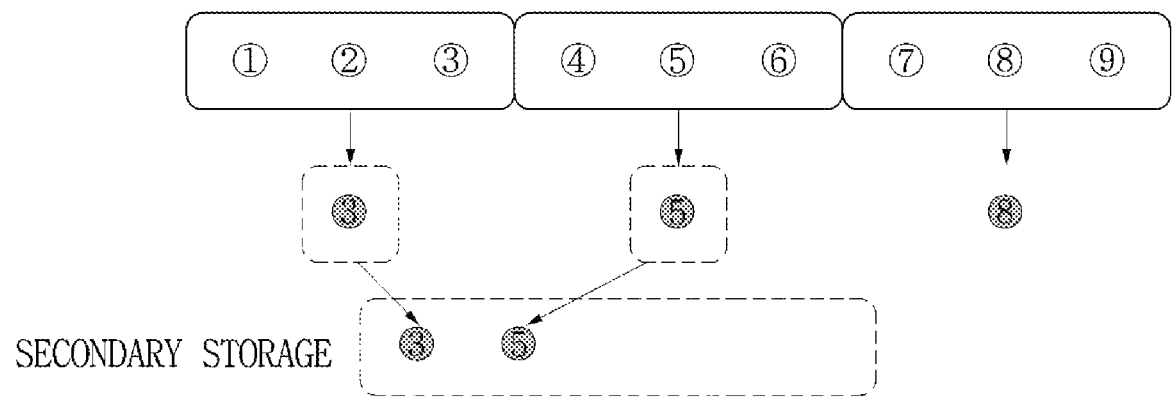
FIGS. 4A and 4B are diagrams illustrating an operation process and a sampling schema of the K-sample method when a sampling fraction is set to "p=0.3"
Figure 4B:
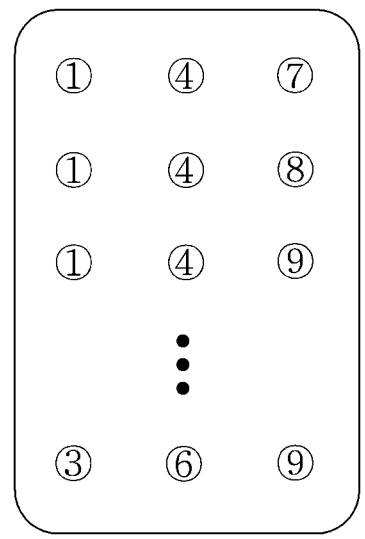

FIGS. 4A and 4B illustrate an operation process and a sampling schema, respectively, of the K-sample method when the sampling fraction is set to "p=0.3".

In the example of FIG. 4A, assuming that the sampling fraction is set to "p=0.3", and nine stream data are input, sample extraction ranges of each slot are set as follows. Specifically, the sample extraction range of the first slot includes data ① to ③, the sample extraction range of the second slot includes data ④ to ⑥, and the sample extraction range of the third slot includes data ⑦ to ⑨. That is, the sample extraction ranges are restricted.

Since the range of the stream data selectable for a particular slot is restrictive in this manner, the sampling schema can be expressed as illustrated in FIG. 4B. This data range is significantly shorter than the "number of different samples of the same size possible statistically". Therefore, the uniformity confidence is maintained at 100% when the sample size is set to "1". However, if the sample size increases to "2" or larger, the uniformity confidence remarkably decreases at the initial stage of the sampling due to the sample range restriction.

A second reason of the initial uniformity confidence reduction is that the data selected as a sample are transferred to the secondary storage and do not change. The stream data included in the extraction range of the sample slot compete with each other for selection as a sample of the corresponding slot. However, if the range of the data stream selectable as a particular slot is finished, and a new slot is generated, the data selected as a sample in the corresponding slot are transferred to the secondary storage, and it is difficult to change the data.

Since it is difficult to change the data selected as a sample for a particular slot, the number of possible samples that can be generated is reduced. In particular, in the K-sample method, since the number of possible samples generable at the initial stage of the sampling in which the sample size increases to "2" or larger remarkably decreases, the uniformity confidence abruptly decreases. The two reasons of the initial uniformity confidence reduction problem can be specifically described as follows.

Sample range restriction: since the range of the stream data selectable for a particular sample slot is restricted, the uniformity confidence decreases.

Unchangeable past sample: if the range of the stream data selectable for a particular sample slot is finished, the data selected as the sample do not change, so that uniformity confidence decreases.

Next, the reason of the steady uniformity confidence reduction problem by which the uniformity confidence steadily decreases as the number of input streams increases in the K-sample method will be described.

The steady uniformity confidence reduction occurs because an increase of the number of possible samples generable in the K-sample method is smaller than an increase of "the number of different samples of the same size possible statistically". As the number of input streams increases, a population size also increases. However, it is difficult to include all of the input streams in the sample extraction range because of a memory loss and a sample range restriction. Therefore, a ratio between "the number of different samples of the same size possible statistically" and the number of possible samples generable in the K-sample method steadily decreases.

Figure 5:
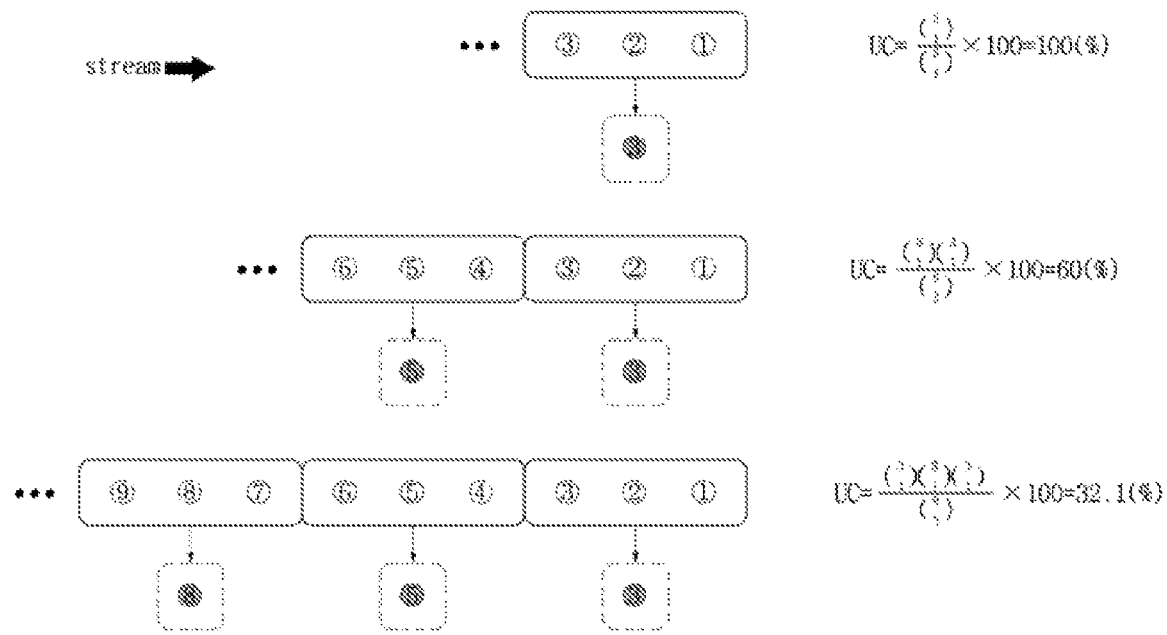
FIG. 5 is a diagram illustrating an operation process and a uniformity confidence calculation method of the K-sample method when the sampling fraction is set to "p=0.3"

FIG. 5 is a diagram illustrating an operation process and a uniformity confidence calculation method when the sampling fraction is set to "p=0.3". FIG. 5 illustrates an operation process of the K-sample method and a result of the uniformity confidence calculation when the sampling fraction is set to "p=0.3".

Referring to FIG. 5, when the data stream length is set to "3", and the sample size is set to "1", the uniformity confidence becomes "100% (=((3|1))/((3|1))×100)".

If the data stream length increases to "6", the population size increases, so that "the number of different samples of the same size possible statistically" becomes "15 (=(6|2))". However, due to the memory loss and the sample range restriction, the number of samples generable in the K-sample method becomes "9 (=(3|1)×(3|1))". Therefore, the uniformity confidence in a case where the data stream length is set to "6" decreases to "60% (=(3|1)(3|1)/((6|2))×100)".

In this manner, the uniformity confidence in a case where the data stream length is set to "9" becomes "32.1% (=(3|1)(3|1)(3|1)/((9|3))×100)". Therefore, as the number of input streams increases, the uniformity confidence gradually decreases. The reason of the steady uniformity confidence reduction problem may be described specifically as follows.

Increase of sample extraction range: since an increase of the number of possible samples generable in the K-sample method is smaller than an increase of "the number of different samples of the same size possible statistically", a ratio between the former and latter numbers of possible samples gradually decreases.

First, the requirement for the sample range restriction as a reason of the initial uniformity confidence reduction problem is called "sample range expansion". The sample range expansion means that a range of the stream data extractable for a particular sample slot during the sampling is expanded to the elements of the sample already selected. If the population size considered during the sampling increases, the number of generable possible samples also increases. Therefore, the uniformity confidence increases.

Figure 6A:
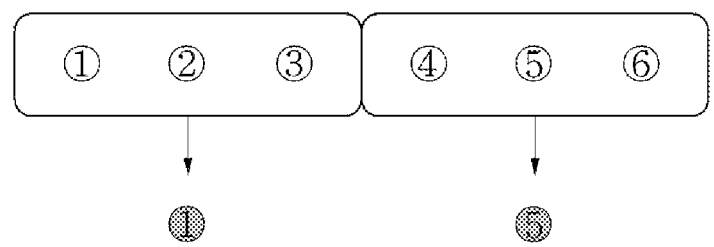
FIGS. 6A and 6B are diagrams illustrating operation processes of the K-sample method and the UC K-sample method when the sampling fraction is set to "p=0.3"; and the number of input streams is set to "6"
Figure 6B:
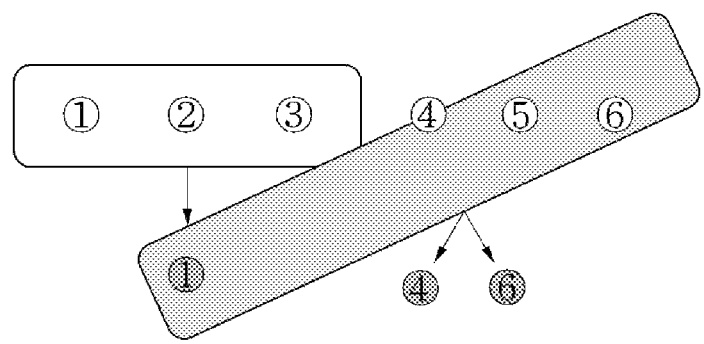

FIGS. 6A and 6B illustrate operation processes of the K-sample method and the UC K-sample method in a case where the number of input streams is set to "6". Specifically, FIGS. 6A and 6B illustrate operation processes of the K-sample method and the UC K-sample method in a case where the sampling fraction is set to "p=0.3", and the number of input stream data is set to "6".

Referring to FIG. 6A, the first sample of the K-sample method includes data ① to ③, and the second sample includes data ④ to ⑥, so that the sample extraction range is restricted.

In comparison, referring to FIG. 6B, in the UC K-sample method, the element ① selected as the first sample is also included in the second sample extraction range, so that two samples are extracted from a new expanded sample extraction range including ①, ④, ⑤, and ⑥.

A requirement for addressing the unchangeable past sample problem is called a "past sample change" scheme. In this scheme, the data already selected as a sample is changeable even after a data stream range that can be extracted as a particular element of the sample is finished. If the data not changeable as it has been already selected as a sample can be changed with another data, this means that the number of extractable possible samples increases. Therefore, the uniformity confidence can be improved by introducing the "past sample change" scheme.

As illustrated in FIG. 6A, in the K-sample method, if the second slot is generated, the element ① already selected in the first slot is transferred to the secondary storage and does not change. In comparison, in the UC K-sample method illustrated in FIG. 6B, the element ① selected in the first slot is not transferred to the secondary storage and remains in the main memory until a certain requirement is satisfied, so that it can be changed with another stream element.

Finally, a requirement for addressing an increase of the sample extraction range that generates a steady uniformity confidence reduction problem includes use of a UC-based window. In the use of the UC-based window, a window size by which the uniformity confidence of the sample can be maintained to be equal to or larger than a lower limitation ε at all times is calculated. Then, the sampling is performed by dividing the input streams in the unit of this window size. The following Formula 2 shows a method of calculating such a window size.

The method of calculating the maximum window size that satisfies the sampling fraction p and the uniformity confidence satisfying the lower limitation ε can be expressed as the following Formula 2.

$$\varepsilon \leq \frac{\sum_{x=max[0,(\lceil kp \rceil+1)-m]}^{\lceil kp \rceil} \binom{k}{x}\binom{m}{\lceil kp \rceil+1-x}}{\binom{k+m}{\lceil kp \rceil+1}} \times 100, \quad [\text{Formula 2}]$$

where "ε" denotes a lower limitation of the uniformity confidence, "p" denotes a sampling fraction, "k" denotes an input stream size until the current time point, and "m" denotes a maximum input stream size allowable when the sample size is incremented by one.

The Formula 2 can be proved as follows.

Figure 7:
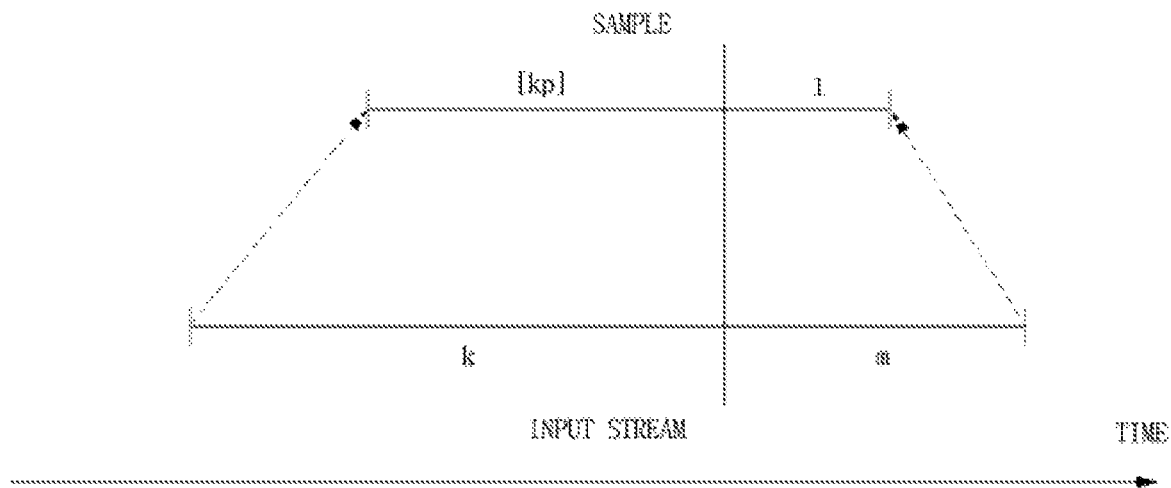
FIG. 7 is a diagram illustrating an operation process of the UC K-sample method when the sample size is incremented by one.

FIG. 7 is a diagram illustrating an operation process of the UC K-sample method when the sample size is incremented by one. Specifically, in the UC K-sample method, the operation is made as illustrated in FIG. 7 when the sample size is incremented by one.

Referring to FIG. 7, in the UC K-sample method, assuming that the input stream size until the current time point is set to "k", "kp" elements are extracted as a sample in order to maintain the sample size at P % of the input stream data. Then, "m" input streams are further input, and the sample size is incremented by one. In this case, "m" has a range equal to or larger than "1" and equal to or smaller than "1/p".

Assuming that (kp+1) data are extracted as a sample from the (k+m) stream data, the "number of different samples of the same size possible statistically" becomes "(k+m)|(kp+1)". Since the UC K-sample method supports the sample range expansion, (kp+1) samples are extracted from (m+kp) stream data. In addition, since the UC K-sample method supports the unchangeable past sample, "x" samples can be changed out of the "kp" samples already extracted in the sampling course. If the number "m" of the newly input stream data is smaller than "kp+1", the number "x" becomes equal to or smaller than "(kp+1−m)". Therefore, the number "x" has a range equal to or larger than "max{0, (kp+1)−m} and equal to or smaller than "r".

In summary, the number of possible samples generable through the UC K-sample method can be expressed as follows.

$$\sum_{x=max[0,(\lceil kp\rceil+1)-m)}^{\lceil kp \rceil} \binom{k}{x}\binom{m}{\lceil kp\rceil+1-x}$$

As expressed in Formula 1, since the uniformity confidence is calculated as a ratio between "the number of different samples of the same size possible statistically" and "the number of different samples of the same size possible with the algorithm", the uniformity confidence of the UC K-sample method can be calculated on the basis of Formula 2. Since the uniformity confidence is required to be larger than the lower limitation at all times when the sample size increases, a sum of the maximum numbers "k" and "m" satisfying Formula 2 is set as the window size.

Figure 8:
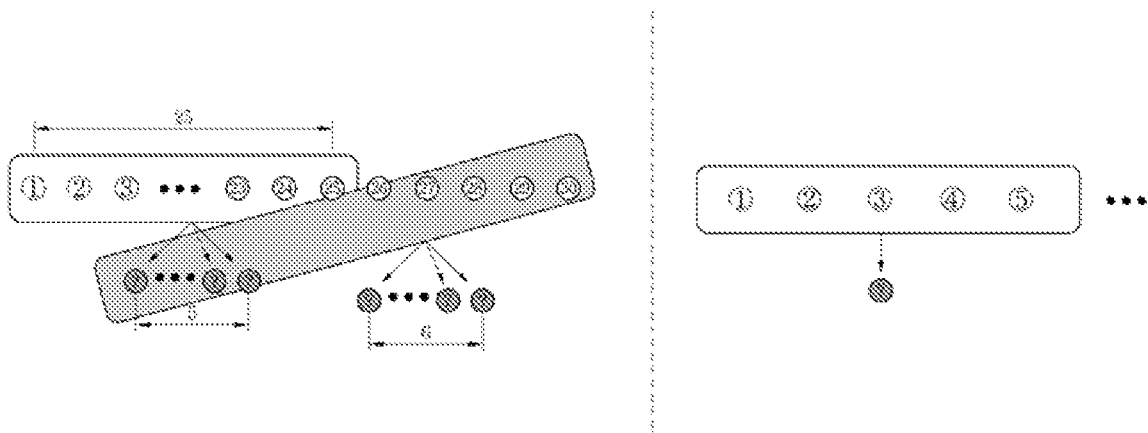
FIG. 8 is a diagram illustrating an operation process of the UC K-sample method when the sampling fraction is set to "p=0.2", and a lower limitation of the uniformity confidence is set to "ε=70%"

FIG. 8 is a diagram illustrating an operation process of the UC K-sample method when "p=0.2" and "ε=70%".

Referring to FIG. 8, the maximum window size satisfying the condition "p=0.2 and ε=70%" is "30". Therefore, the sampling is performed for six data while the sample size is maintained at 20% of the input data stream until thirty stream data are input. Then, if the input data stream length exceeds "30", the sampling is performed using a new window.

Figure 9:
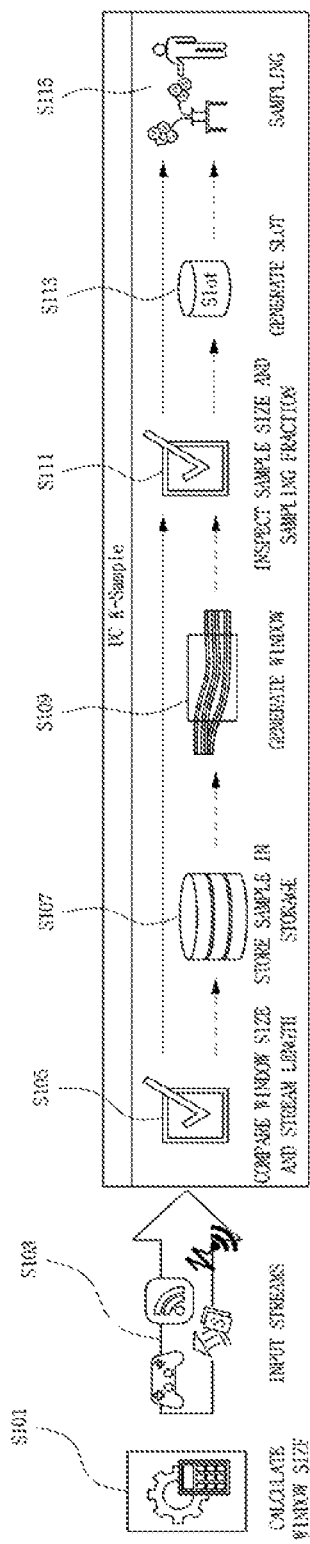
FIG. 9 is a diagram illustrating an operation process of the UC K-sample method according to an embodiment of the invention.
Figure 10:
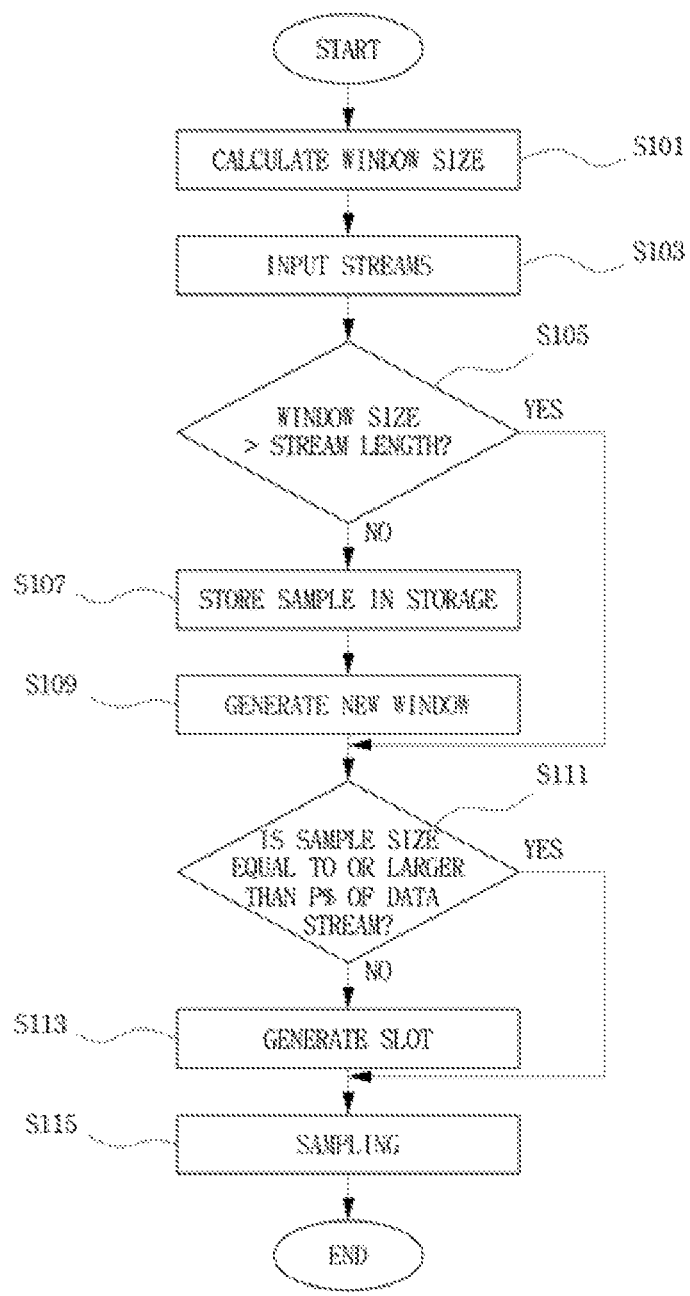
FIG. 10 is a flowchart illustrating a variable-size sampling method under a streaming environment according to an embodiment of the invention.

FIG. 9 is a diagram illustrating an operation process of the UC K-sample method according to an embodiment of the invention. FIG. 10 is a flowchart illustrating a variable-size sampling method under a streaming environment according to an embodiment of the invention.

Referring to FIGS. 9 and 10, the variable-size sampling method under a streaming environment according to an embodiment of the invention is performed as follows.

First, a maximum window size satisfying the lower limitation ε of the uniformity confidence defined by a user at all times is calculated (S101).

If the window size is calculated, data streams to be sampled are input (S103).

Then, the window size and the stream length input until the current time point are compared (S105).

If the window size is larger than the stream length, the sample size and the sampling fraction are inspected (S111).

Otherwise, if the window size is smaller than the stream length, the sample generated using the current window is stored in the secondary storage in order to maintain the uniformity confidence at the lower limitation or higher (S107). In addition, a new window is generated (S109). Here, the new window is created in step S109 in order to maintain the uniformity confidence at the lower limitation or higher.

Then, the sample size and the sampling fraction are inspected (S111). That is, in order to maintain the sampling fraction for the data stream, it is checked whether the current sample size is equal to or larger than P % of the data stream whenever a data stream is input (S111).

If the current sample size is smaller than P % of the data stream, a slot for increasing the sample size is additionally generated (S113), and the sampling is performed (S115).

Otherwise, if the current sample size is equal to or larger than P % of the data stream, the sampling is directly performed without generating the slot (S115).

According to the invention, step S113 is performed to increase the sample size by generating a single slot as a single element memory space added to the sample.

Step S115 is a course of sampling for the current slot. If a probability that the data stream element is selected for the slot is higher than a random value arbitrarily generated, this data stream is inserted into the slot and is replaced with the element stored in the existing slot.

FIG. 11 illustrates an algorithm of the UC K-sample method according to an embodiment of the invention.

Referring to FIG. 11, in the UC K-sample method, a sampling fraction p, a stream, and a lower limitation ε are input, and sampling starts using an empty sample reservoir. First, the maximum window size w satisfying the lower limitation of the uniformity confidence is calculated on the basis of Formula 2 (line 3).

If the stream length sLength input until the current time point is "1", or the stream length wLength input to the current window is larger than the window size, the sample generated until the current time point is stored in the secondary storage. Then, sampling starts again by generating a new window (lines 7 to 9).

As a data stream element is input, a random number is generated for each element (line 10).

If the current sample size is smaller than "p×wLength", the sample size is incremented by one, and the currently incoming data is added to the sample along with the random number in order to maintain the sampling fraction for the data stream size (lines 11 to 13).

Otherwise, if the current sample size is not smaller than (p×wLength), an element having the smallest random number out of the sample is compared with the random number of the currently incoming element in order to inspect whether or not the current element can be input to the existing sample (line 16).

If the random number of the current data is larger than the smallest random number of the sample, the element having the smallest random number is removed, and the current data is inserted into the sample (lines 16 and 17). This process is repeated until the stream input operation is completed, or a user interrupts the sampling (lines 4 to 19).

Under a streaming environment in which data are created in real time, it is difficult to perform sampling for all of the data due to a memory constraint problem. Instead, the sampling is performed by using only the data stored in the memory at the current time point as a sample extraction range. Therefore, it is necessary to provide a factor for maintaining the sampling performance. According to the present invention, the uniformity confidence can serve as a criterion for determining sampling performance, and the UC K-sample can be used to remarkably improve the sampling performance under a streaming environment.

Although exemplary embodiments of the present invention have been shown and described, it will be apparent to those having ordinary skill in the art that a number of changes, modifications, or alterations to the invention as described herein may be made, none of which depart from the spirit of the present invention. All such changes, modifications and alterations should therefore be seen as within the scope of the present invention.

What is claimed is:

1. A variable-size sampling method under a data-streaming environment, comprising:
    calculating a maximum window size that satisfies a lower limitation ($\varepsilon$) of a predetermined uniformity confidence level at all times;
    inputting a data stream to be sampled if the maximum window size is calculated;
    comparing a data stream length of the data stream input until a current time point with the maximum window size;
    inspecting a sample size and a sampling fraction if the maximum window size is larger than the data stream length;
    performing sampling by generating a slot to increase the sample size if a current sample size is smaller than a predetermined percentage (P %) of the data stream as a result of the inspection of the sample size and the sampling fraction; and
    directly performing sampling without generating a slot if the current sample size is equal to or larger than the predetermined percentage (P %) of the data stream as a result of the inspection of the sample size and the sampling fraction.

2. The variable-size sampling method according to claim 1, further comprising:
    storing the sample generated from a current window in a storage if the maximum window size is smaller than the data stream length; and
    inspecting the sample size and the sampling fraction by generating a new window.

3. The variable-size sampling method according to claim 2, wherein, if a probability that a data stream element is selected for a slot is higher than a random value generated arbitrarily in performing the sampling, the data stream is inserted into the slot and is replaced with an element stored in an existing slot.

4. The variable-size sampling method according to claim 1, wherein the percentage P % is expressed as "p×100" where "p($\in$[0, 1])" denotes the sampling fraction.

5. The variable-size sampling method according to claim 4, wherein the maximum window size satisfying the lower limitation ($\varepsilon$) of the uniformity confidence and the sampling fraction (p) is calculated on the basis of the following formula:

$$\varepsilon \leq \frac{\sum_{x=max[0,(\lceil kp \rceil+1)-m]}^{\lceil kp \rceil} \binom{k}{x}\binom{m}{\lceil kp \rceil+1-x}}{\binom{k+m}{\lceil kp \rceil+1}} \times 100,$$

where "$\varepsilon$" denotes the lower limitation of the uniformity confidence, "p" denotes the sampling fraction, "k" denotes a size of the stream incoming until the current time point, and "m" denotes the maximum input stream size that can input by incrementing the sample size by one.

* * * * *